United States Patent [19]

Chataignon et al.

[11] Patent Number: 4,488,007
[45] Date of Patent: Dec. 11, 1984

[54] SPEECH-AMPLIFIER TELEPHONE STATION

[75] Inventors: André Chataignon; Jean-Pierre Poirier; Du Phan Tich, all of Colombes, France

[73] Assignee: Thomson-CSF-Telephone, Colombes, France

[21] Appl. No.: 450,252

[22] Filed: Dec. 16, 1982

[30] Foreign Application Priority Data

Dec. 18, 1981 [FR] France .................. 81 23727

[51] Int. Cl.³ ............................................. H04M 1/60
[52] U.S. Cl. ............................................. 179/81 B
[58] Field of Search .................. 179/81 B, 100 L; 381/83, 93, 110

[56] References Cited

U.S. PATENT DOCUMENTS 3,894,187 7/1975 Shibata et al. ............... 179/81 B
4,317,959 3/1982 Kuriki .......................... 179/100 L

FOREIGN PATENT DOCUMENTS 1160897 1/1964 Fed. Rep. of Germany .
1228310 11/1966 Fed. Rep. of Germany .
1812273 7/1969 Fed. Rep. of Germany .
1602415 12/1970 France .
2452215 10/1981 France .
2500698 8/1982 France ...................... 179/81 B

OTHER PUBLICATIONS

Rev. of Elec. Comm. Lab's, vol. 24, No. 3-4, 1976, Tokyo, K. Kato "A Voice Switching Circuit . . . ", pp. 235-245.
B. Copping, "Designing a Voice Switching . . . ", The Post Office Electrical Engineer's J., vol. 60, No. 1, 1967, pp. 65-67.

Primary Examiner—Keith E. George
Attorney, Agent, or Firm—Roland Plottel

[57] ABSTRACT

The telephone station has a first attenuator inserted in a transmission channel, and a second attenuator inserted in a reception channel. Each attenuator has a variable impedance mounted in shunt on the corresponding channel. A circuit controls the attenuators as a function of the relative levels of signals collected respectively from the transmission and reception channels. A bridge circuit introduces a difference between the levels of the signals collected respectively from the two channels. The bridge circuit includes a resistor bridge formed by two fixed resistors inserted in each channel upstream of the attenuator which is associated with said channel, and by a variable impedance which constitutes the attenuator. The common node of the two fixed resistors is the point of collection of the signal from each channel.

4 Claims, 2 Drawing Figures

4,488,007

SPEECH-AMPLIFIER TELEPHONE STATION

BACKGROUND OF THE INVENTION (1) Field of the Invention

This invention relates to a speech-amplifier telephone station which is more generally known as a "hands-free" telephone station.

In hands-free telephone stations, a highly sensitive microphone and a loudspeaker associated with high-gain amplifiers are integrated with the telephone housing, thus making it unnecessary for a microphone transmitter and receiver to be held to the user's mouth and ear. The convenient features and ease of use offered by subscriber stations of this type are offset, however, by a few constraints which are caused by the following phenomena.

Because they are high-gain amplifiers in telephone stations of this type, the acoustic coupling which arises between the loudspeaker and the microphone very rapidly results in the appearance of a whistling noise which is known as the Larsen effect and makes conversation practically inaudible.

Similarly, because a circuit is provided within the telephone station for coupling it with the telephone line and switching the signal received from the line to the loudspeaker, the signal transmitted by the microphone to the telephone line produces a capacitive coupling between the transmission and reception channels as a result of the unbalance introduced by the line at the level of the device for differential coupling of these two channels. By reason of the presence of high-gain amplifiers, the capacitive coupling just mentioned also causes whistling noise.

(2) Description of the Prior Art

In order to eliminate this unpleasant whistling noise, a known practice consists of interrupting the loop which permits sustained oscillations caused by Larsen effect or microphonic noise. This is done either by interrupting the connection between the coupling circuit and the loudspeaker or by interrupting the connection between the microphone and the coupling circuit, depending on whether the user is talking or listening. Under these conditions, a hands-free subscriber station achieves reproduction of speech with satisfactory fidelity only if the two correspondents speak in alternate sequence and not simultaneously. The interruption can be replaced by very high attenuation, which considerably limits the consequences of the Larsen effect and does not completely exclude the possibility of intervention by the correspondent.

A hands-free station of this type is described in French patent Application No. 79 07 109 French Pat. No. 2,452,215.

This station includes two switches, one placed on the reception channel between the coupling circuit and the loudspeaker, the other or the transmission channel between the microphone and the coupling circuit. Control of these switches is based on a comparison of the signals collected upstream of the switches, on the transmission channel between the microphone and the switch associated with that channel, and on the reception channel between the coupling circuit and the switch associated with that channel.

Because the compared signals are collected upstream of the switches, the Larsen effect is taken into account in this comparison. It must be insured, however, that the presence of the Larsen effect upstream of the switch on the interrupted channel is not interpreted as an indication of the presence of a speech signal and accordingly countermands the decision to close the switch on the other channel since this would result in chopping of the communication.

A known expedient proposed by the patent application cited earlier is collecting the same sign quantity on both channels as long as none of the switches has been closed, and then introducing a difference in the signal quantity collected on both channels when one of the switches has been closed.

The aforementioned patent Application proposes to control one of the switches by first making a comparison between the signal collected from the transmission channel and. The signal which is collected from the reception channel and to which a multiplication factor is assigned in the event of a signal which is present on both channels; thus multiplication factor is made dependent on the value of the signal obtained on completion of the first comparison. In order to control the other switch, a second comparison is made between the signal collected from the reception channel and the signal which is collected from the transmission channel and to which a multiplication factor is assigned in the event of a signal which is present on both channels. This multiplication factor is made dependent on the value of the signal obtained on completion of the second comparison.

The complexity of this method for processing collected signals requires that speech signals be converted to binary data, which is turn calls for a complex control logic system and for insertion for a delay line between the point of collection of the signal on each channel and the switch associated with each channel. The time-delay produced by this delay line is equal to the time of processing of the collected signals.

SUMMARY OF THE INVENTION

The speech-amplifier telephone station in accordance with the invention makes it possible to simplify the processing of signals collected from the transmission and reception channels, to reduce the cost involved in processing these signals, to reduce the processing time required for detecting the presence of a speech signal on one of the channels, and to prevent any whistling noise produced by the Larsen effect from appearing on one channel after a speech signal has been detected on the other channel.

A speech-amplifier telephone station in accordance with the invention includes a first attenuator inserted in a transmission channel for connecting a microphone to a circuit which provides a coupling with a telephone line, a second attenuator inserted in a reception channel for connecting the coupling circuit to a loudspeaker and means for controlling the attenuators as a function of the relative levels of the signals collected upstream of the attenuators in the transmission and reception channels, the levels being calculated by integrators. Means are further provided for introducing a difference between the levels of signals collected from the two channels once the attenuator associated with one of the channels has been put in the attenuation position and the attenuator associated with the other channel has been put in the nonattenuation position. Each attenuator has a variable impedance which is mounted in shunt on the corresponding channel and is capable of assuming two values, namely a very low value and a very high value.

A difference between the levels of the signals collected from the two channels is provided by a resistor bridge formed by two fixed resistors inserted in each channel upstream of the attenuator which is associated with the channel, and by the variable impedance which is the attenuator. The common node of the two fixed resistors is intended to be the point of collection of the signal from each channel.

Furthermore, in order to permit a comparison of the signals collected from the transmission and reception channels with a stable result, it is necessary to suppress the peaks which may arise, for example, from violent intonations or to suppress gaps resulting, for example, from silent periods between the words of a particular phrase. If such a precaution were not taken, the action produced by the switches placed in the transmission and reception channels would in fact have the effect of "chopping" the communication.

In order to overcome this drawback, and again with the same general objective of higher speed of processing of the signals collected from the transmission and reception channels, the present invention also proposes a device for very fast integration of signals, which is being of simple design and well suited to the specificity of speech signals.

Other features of the invention will be more apparent to those skilled in the art upon consideration of the following description and accompanying drawings.

Identical elements shown in the different figures are designated by identical references.

DESCRIPTION OF THE PREFERRED EMBODIMENT

Figure 1:
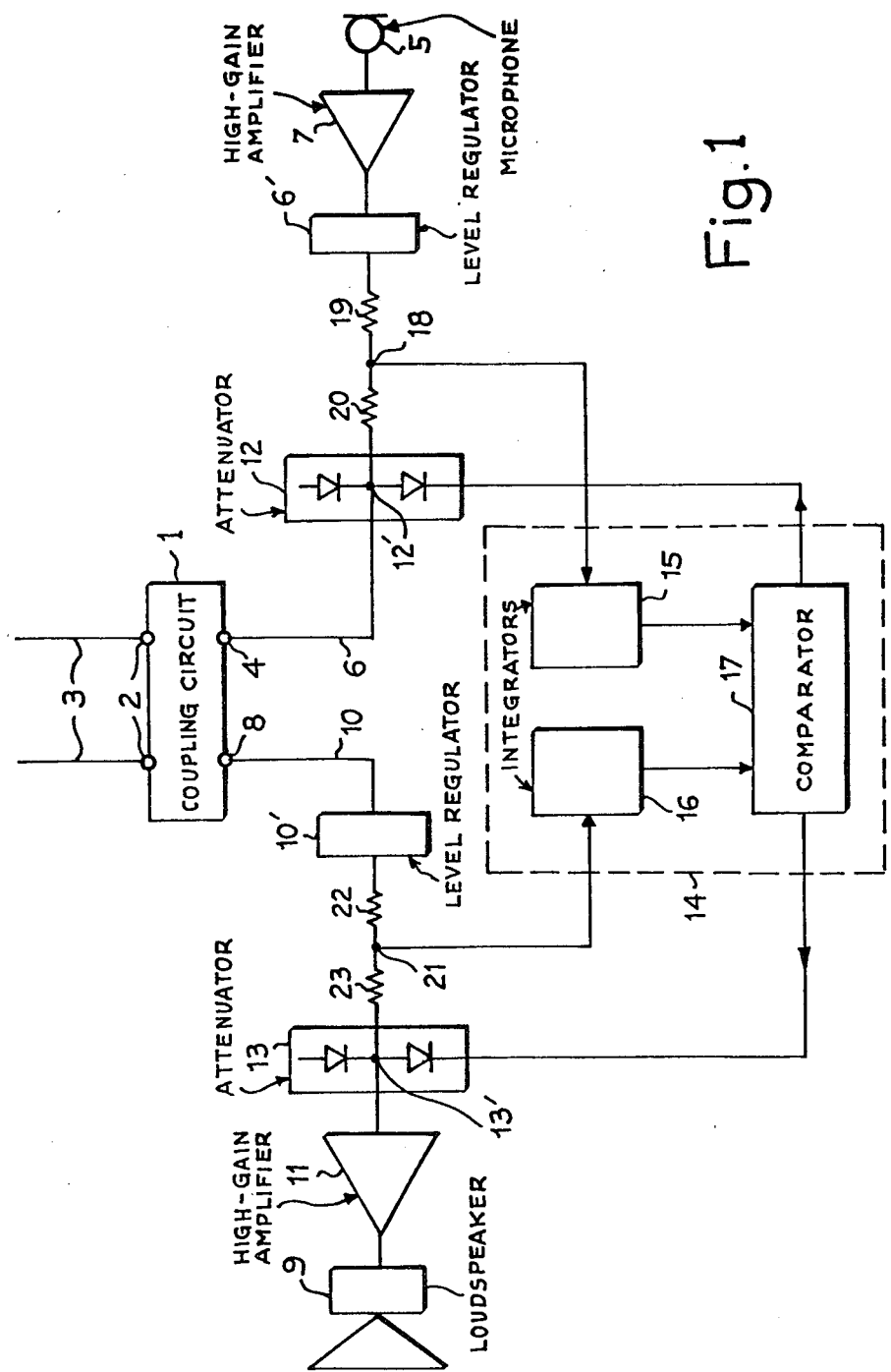
FIG. 1 is a block diagram showing a telephone station in accordance with the present invention.

The hands-free telephone station illustrated in FIG. 1 includes a coupling circuit 1 provided with inputs/outputs 2 connected to a two-wire telephone line 3, with an input 4 connected to a high-sensitivity microphone 5 via a transmission channel 6 on which are localized a first automatic level regulator 6' and a high-gain amplifier 7. An output 8 is connected to a loudspeaker 9 via a reception channel 10 on which are localized a second automatic level regulator 10' and a high-gain amplifier 11.

In accordance with the principles set forth in the foregoing, an attenuator 12 is placed on the transmission channel at a point 12' located between the automatic level regulator 6' and the input 4 of the coupling circuit. An attenuator 13 is also placed on the reception channel at a point 13' located between the automatic level regulator 10' and the amplifier 11.

These attenuators are represented diagrammatically by two diodes connected via a first terminal respectively to the point 12' in the case of the transmission channel and to the point 13' in the case of the reception channel. Control of the attenuators 12 and 13 is ensured by controller 14 provided with two outputs connected to a circuit for controlling diodes which constitute the attenuators 12 and 13.

The controller 14 includes an integrator 15 for the signal which is present at a point of the transmission channel 6 located between the automatic level regulator 6' and the node 12', and include an integrator 16 for the signal which is present at a point of the reception channel 10 located between the automatic level regulator 10' and the node 13'.

The controller 14 also has a comparator 17 which compares the levels supplied by the integrating circuits 15 and 16 and then compares the signal retained on completion of this comparison with a predetermined threshold value. The comparator 17 is provided with two outputs constituting the outputs of the controller 14.

In accordance with the invention, the input signal of the integrator 15 is collected at a common node 18 of two resistors 19 and 20 inserted in the transmission channel 6 between the automatic level regulator 6' and the node 12'. Similarly, the input signal of the integrator 16 is collected at a common node 21 of two resistors 22 and 23 which are inserted in the reception channel 10 between the automatic level regulator 10' and the node 13'.

The operation of the hands-free station will now be explained with reference to FIG. 1, consideration being given to the different alternative forms which may be contemplated.

The attenuators 12 and 13 employed in this station make use of the variation in impedance of two diodes when a current produced by a generator 123 or 133 passes through the diodes. When no current flows within the diodes, these latter have a high impedance. When the current delivered by the generator flows within the diodes, these latter have a very low impedance. It is possible to control the attenuation provided by the diodes by causing a current of more or less high intensity to flow within these latter since the variation of their impedance is a function of the current which they carry.

In contrast to switches, the advantage of these attenuators is that no clicking occurs at the time of channel switching. Furthermore, since the attenuators allow a portion of signal to pass, the user who is speaking understands that the listening party desires to speak in his or her turn.

When the attenuators 12 and 13 are both in the attenuation position or in other words when the diodes have a very low impedance, the voltage collected at the node 18 is equal to a fraction of the voltage obtained at the output of the automatic level regulator 6'. In practice, this fraction is equal to the ratio between the resistance 19 and the sum of the resistances 19 and 20 and of the resistance of the two diodes. Similarly, the voltage collected at the node 21 is equal to a fraction of the voltage obtained at the output 8 of the coupling circuit. This fraction is equal to the ratio between the resistance 22 and the sum of the resistances 22 and 23 and of the resistance of the two diodes.

Thus, when the attenuators 12 and 13 are both in the attenuation position, the signals collected at the nodes 18 and 21 are both constituted by a fraction of the speech signals as these latter appear at the output of the automatic level regulators 6' and 10'.

On the other hand, when one of the attenuators 12 or 13 is in the attenuation position and the other is in the non-attenuation position, for example, when the attenuator 12 is in the non-attenuation position and the attenuator 13 is in the attenuation position (this situation arises when the local subscriber is speaking), the diodes making up the attenuator 12 have a high impedance, while the diodes constituting the attenuator 13 have a very low impedance. The voltage collected at the node 21 is therefore always equal to a fraction of the voltage obtained at the output of the automatic level regulator 6', whereas the voltage collected at the node 18 is equal to the voltage obtained at the output of the automatic level regulator 10'. The resistors 19 and 20 are connected in series but have a negligible value of resistance since the coupling circuit 1 has a high-impedance input 4. The situation would clearly be reversed if the attenuator 13 were in the non-attenuation position and the attenuator 12 were in the attenuation position.

Thus, when the two attenuators are not in the same state, an unbalance is created between the signal quantity collected from the transmission and reception channels, respectively. There is collected on one of these channels the speech signal as it really appears at the output of the automatic level regulator which is associated with said channel, while only a fraction of said speech signal is collected on the other channel.

This makes it possible to guard against any accidental switching caused by acoustic coupling between the microphone and the loudspeaker or against poor rejection of the differential system of the coupling circuit as a result of the line employed. Furthermore, switching from a fraction of the signal to the full signal and conversely take place instantaneously as soon as the state of an attenuator changes. This station does not require the insertion of any delay line in the transmission and reception channels and no additional time-delay is introduced in the routing of a communication.

Figure 2:
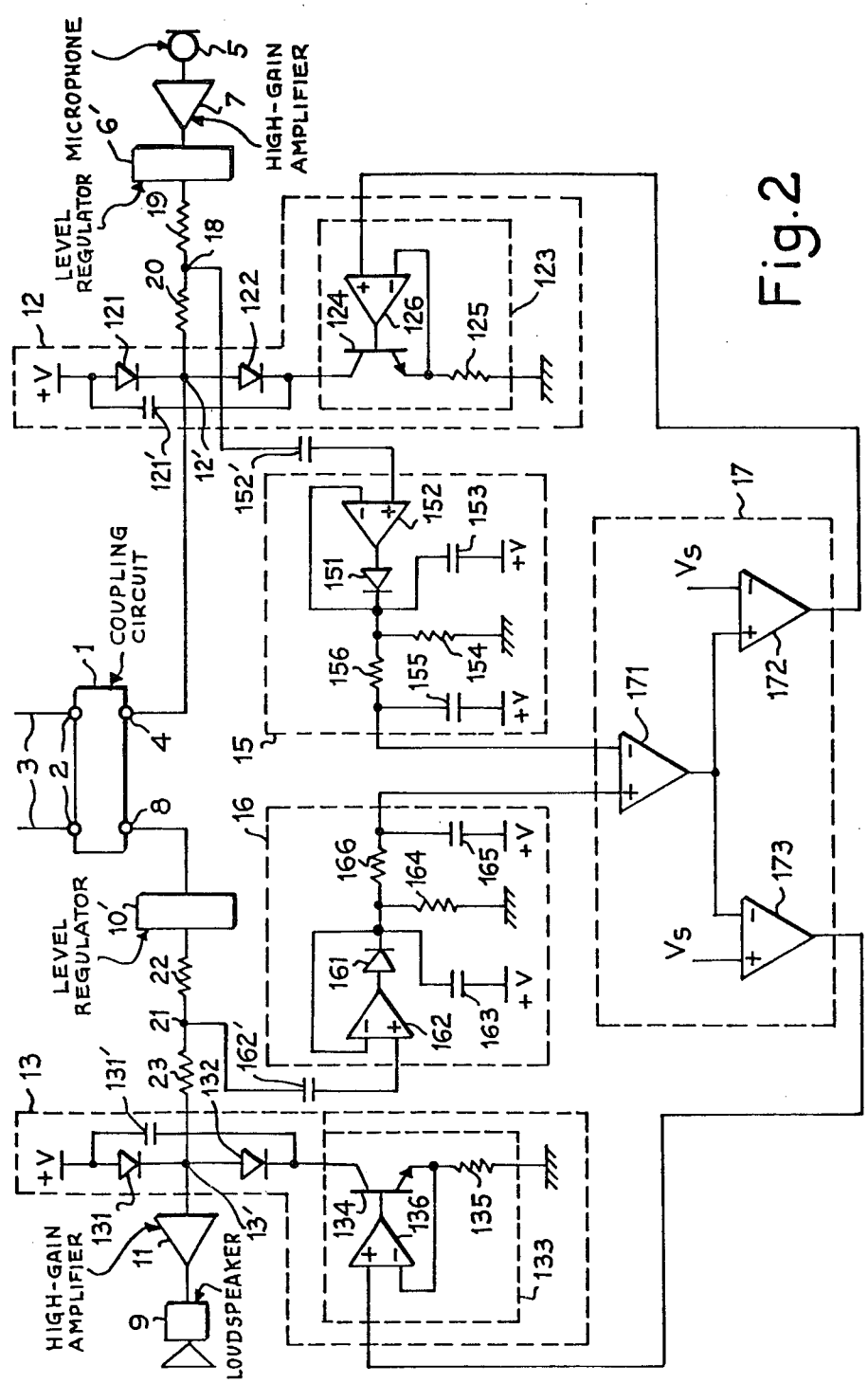
FIG. 2 is a detailed diagram of a telephone station in accordance with the present invention.

In FIG. 2, the attenuators 12 and 13 and the integrators 15 and 16 are shown in greater detail.

The attenuator 12 has a first diode 121 whose anode is connected to a direct-current voltage source which delivers a potential $+V$ and whose cathode is connected to the node 12' of the transmission channel. The attenuator 12 also has a second diode 122 whose anode is connected to the node 12' of the transmission channel and whose cathode is connected to the output of a current generator 123. The anode of the diode 121 is connected to one of the terminals of a capacitor 121', the other terminal of the capacitor 121' being connected to the cathode of the diode 122.

The current generator 123 includes, for example a transistor 124 whose collector is connected to the cathode of the diode 122, whose emitter is connected via a resistor 125 to a direct-current voltage source which delivers a reference potential, and an operational amplifier 126. The non-inverting input of amplifier 126 is connected to one of the outputs of the comparator 17, its inverting input is connected to the emitter of the transistor 124, and its output is connected to the base of the transistor 124.

The attenuator 13 is provided with the same elements arranged in the same manner and designated by the same references as the attenuator 12; a first diode 131, a second diode 132, a capacitor 131' and a current generator 133. This in turn includes a transistor 134, a resistor 135, and an operational amplifier 136 whose non-inverting input is connected to the other output of the comparator 17.

The integrator 15 has a rectifying cell which in turn has a diode 151 and an operational amplifier 152. The non-inverting input of the operational amplifier 152 is connected to one of the terminals of a coupling capacitor 152', the other terminal of the coupling capacitor 152' being connected to the node 18 of the transmission channel. The inverting input of the operational amplifier 152 is connected to the cathode of the diode 151 and the anode of the diode 151 is connected to the output of the operational amplifier 152.

The integrator 15 further has a first R-C circuit constructed by means of a capacitor 153 which is provided with a first terminal connected to the cathode of the diode 151 and with a second terminal connected to a direct-current voltage source which delivers a potential $+V$, and also a resistor 154 having a first terminal connected to the cathode of the diode 151 and a second terminal connected to a direct-current voltage source which delivers a reference potential.

The integrator 15 also includes a second R-C circuit constructed by means of the resistor 154, of a capacitor 155 and of a resistor 156. The capacitor 155 is provided with a first terminal connected to a direct-current voltage source which delivers a potential $+V$, and with a second terminal which constitutes the output of the integrator 15, the resistor 156 is connected via a first terminal to the first terminal of the resistor 156 and via a second terminal to the second terminal of the capacitor 155.

The integrator 16 is identical with the integrator 15 and is constructed from the same elements arranged in the same manner: a diode 161, an operational amplifier 162, a coupling capacitor 162', a capacitor 163, a resistor 164, a capacitor 165 and a resistor 166.

The comparator 17 has a first comparator 171 provided with an inverting input connected to the output of the integrator 15 and with a non-inverting input connected to the output of the integrator 16, a second comparator 172 provided with a non-inverting input connected to the output of the comparator 171 and with an inverting input which continuously receives a threshold voltage $V_S$; and a third comparator 173 provided with an inverting input connected to the output of the comparator 171 and with a non-inverting input which also continuously receives the same threshold voltage $V_S$. The output of the comparator 172 is one of the outputs of the comparator 17 and is connected to the control input of the current generator 123. The output of the comparator 173 is the other output of the comparator 17 and is connected to the control input of the current generator 133.

Consideration will now be given to the operation of the telephone station shown in FIG. 2. The operation of the integrators and in particular of the integrator 15, will first be explained.

The alternating-current signal collected at the node 18 of the transmission channel is first rectified by the rectifying cell consisting of the diode 151 and of the operational amplifier 152. The signal which has thus been rectified then undergoes a first integration through the first R-C circuit consisting of the capacitor 153 and the resistor 154.

The charge time constant of said first R-C circuit is very short, while its discharge time constant is chosen so as to permit smoothing of the fundamental phonetic units, the syllables. In fact, since the successive syllables of any given word are not emitted with the same intensity, it is necessary to carry out smoothing in order to prevent untimely operation of the attenuators according to the intensity emitted. The discharge time constant of said first R-C circuit is therefore chosen so as to be equal to the mean time-duration of one syllable.

The envelope obtained on completion of this initial integration undergoes an integration in the second R-C circuit constituted by the capacitor 155 and by the resistors 154 and 156. The discharge time constant of said second R-C circuit is chosen so as to permit smoothing of the groups of syllables, that is, of the words. In fact, since the presence of silent periods between the successive words of any one phrase can also give rise to chopping of speech, it is necessary to perform a smoothing operation. The time constant of said second R-C circuit is therefore chosen so as to be equal to the mean time-duration of the intervals between the words of a given phrase.

The envelopes obtained at the output of the integrators 15 and 16 on completion of these two successive smoothing operations are practically identical with a direct-current voltage, thus making it possible to carry out a comparison of these two envelopes with a stable result.

This particular structure of the integrators serves to achieve enhanced speed and reliability in the treatment of signals collected from the transmission and reception channels. The first R-C circuit which has the intended function of smoothing syllables has a very short charge time constant and therefore a very short response time. This permits very fast operation of the attenuators and makes it possible to avoid the need to chop the first syllables of a communication.

The operation of the attenuators will now be explained.

The attenuator 12 is constructed in the form of two diodes 121 and 122 mounted in the same direction. These diodes are decoupled by a capacitor 121' which makes it possible to symmetrize the two-diode assembly in order to prevent any distortion of the low-frequency signal. The current which flows through the diodes is fixed by the current generator 123 which is constituted by the operational amplifier 126, the transistor 124 and the resistor 125. The base current of the transistor 124 is fixed by the operational amplifier 126 and the current which flows through the diodes is in turn fixed by the resistor 125. The operational amplifier 126 is in turn controlled by the output of the comparator 17.

The comparator 17 is arranged, so that, if the level of the signal at the output of the integrator 15 proves to be both higher than the level of the signal at the output of the integrator 16 and higher than the threshold level $V_S$, then (a) base current of the transistor 124 is zero, and (b) the diodes 121 and 122 exhibit a very high impedance, and (c) the base current of the transistor 134 is equal to a value such that the diodes 131 and 132 exhibit a very low impedance. This is equivalent to placing the attenuator 12 in the non-attenuation position and the attenuator 13 in the attenuation position. The situation would clearly be reversed if the level of the signal obtained at the output of the integrator 16 were higher than the level of the signal obtained at the output of the integrator 15.

The arrangement described in FIG. 2 is improved by means of the automatic level regulators 6' and 10'. These are inserted upstream of the points of collection of signals on the transmission and reception channels, and are intended to remove disturbances introduced in the transmission channel by the fact that the local subscriber may speak at a distance from the microphone, and on the reception channel by the fact that the attenuation introduced by the telephone line is of greater or lesser value.

What is claimed is:

1. A speech-amplifier telephone station comprising a first attenuator inserted in a transmission channel for connecting a microphone to a circuit which provides a coupling with a telephone line, a second attenuator inserted in a reception channel for connecting said coupling circuit to a loudspeaker, means for controlling said attenuators as a function of the relative levels of the signals collected respectively upstream of said attenuators in said transmission and reception channels, said levels being calculated respectively by integrators, and means for introducing a difference between the levels of signals collected respectively from said channels once said attenuator associated with one of the channels has been put in an attenuation state and said attenuator associated with the other channel has been put in a non-attenuation state, each attenuator aforesaid being constituted by a variable impedance which is mounted in shunt on the corresponding channel and is capable of assuming two values, namely a very low value and a very high value, said means for introducing a difference between the levels of the signals collected respectively from said channels consisting of a resistor bridge formed by means of two fixed resistors inserted in each channel aforesaid upstream of said attenuator which is associated with said channel, and by means of said variable impedance which constitutes said attenuator, the common node of said two fixed resistors being intended to constitute the point of collection of the signal from each of said channels, each attenuator aforesaid being constituted by two diodes mounted in the same direction and having a common electrode connected to said channel which is associated with said attenuator, the other electrode of one of said diodes being put at a given potential whilst the other electrode of said diode is connected to one of the terminals of a current generator which is capable of generating a current having a first or a second value according to the control applied thereto by said control means, said diodes being such as to have a very low resistance or a very high resistance according to the current which flows through said diodes at said first or said second value, the other terminal of said current generator being put at a given potential, one of said two given potentials being intended to constitute a reference potential.

2. A telephone station according to claim 1, wherein each integrator aforesaid comprises a rectifying circuit followed by a first smoothing circuit which is capable of carrying out smoothing of syllables and is in turn followed by a second smoothing circuit for carrying out smoothing of words.

3. A telephone station according to claim 2, wherein said first smoothing circuit is an R-C circuit having a very short charge time constant and a discharge time constant which is equal to the mean time-duration of one syllable.

4. A telephone station according to claim 2, wherein the second smoothing circuit is an R-C circuit having a discharge time constant equal to the mean time-duration of the silent periods between words of any given phrase.

* * * * *